United States Patent
Williams

(10) Patent No.: US 6,801,584 B1
(45) Date of Patent: Oct. 5, 2004

(54) USING A DIFFERENTIAL SIGNAL IN ADJUSTING A SLICE VOLTAGE FOR A SINGLE-ENDED SIGNAL

(75) Inventor: Emrys J. Williams, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 635 days.

(21) Appl. No.: 09/610,176

(22) Filed: Jul. 5, 2000

(51) Int. Cl.$^7$ .......................... H04L 27/06; H04L 25/00
(52) U.S. Cl. ...................................... 375/316; 375/257
(58) Field of Search ................................ 375/316, 244, 375/259, 354, 353, 257, 258, 377, 355; 326/86; 327/297; 330/279; 710/305

(56) References Cited

U.S. PATENT DOCUMENTS

| | | | | |
|---|---|---|---|---|
| 6,151,648 A | * | 11/2000 | Haq | 710/107 |
| 6,154,498 A | * | 11/2000 | Dabral et al. | 375/257 |
| 6,424,177 B1 | * | 7/2002 | Hairapetian | 326/86 |
| 6,600,374 B2 | * | 7/2003 | Nguyen et al. | 330/279 |

\* cited by examiner

*Primary Examiner*—Young T. Tse
*Assistant Examiner*—Sam K. Ahn
(74) *Attorney, Agent, or Firm*—Park, Vaughan & Fleming LLP

(57) ABSTRACT

A system for receiving electrical signals that use a differential signal in adjusting a slice voltage for a single-ended signal. This differential signal includes two signal lines. A first value is represented by the first signal line at a higher voltage than the second signal line, and a second value is represented by the first signal line at a lower voltage than the second signal line. The system receives the differential signal at the destination and compares it against the slice voltage to obtain a comparison. The system uses the comparison result to adjust the slice voltage, and uses the slice voltage as a reference signal in capturing the single-ended signal. Note that this single-ended signal includes a single signal line, wherein the first value is represented on this line by a voltage above the slice voltage, and the second value is represented by a voltage below the slice voltage.

20 Claims, 6 Drawing Sheets

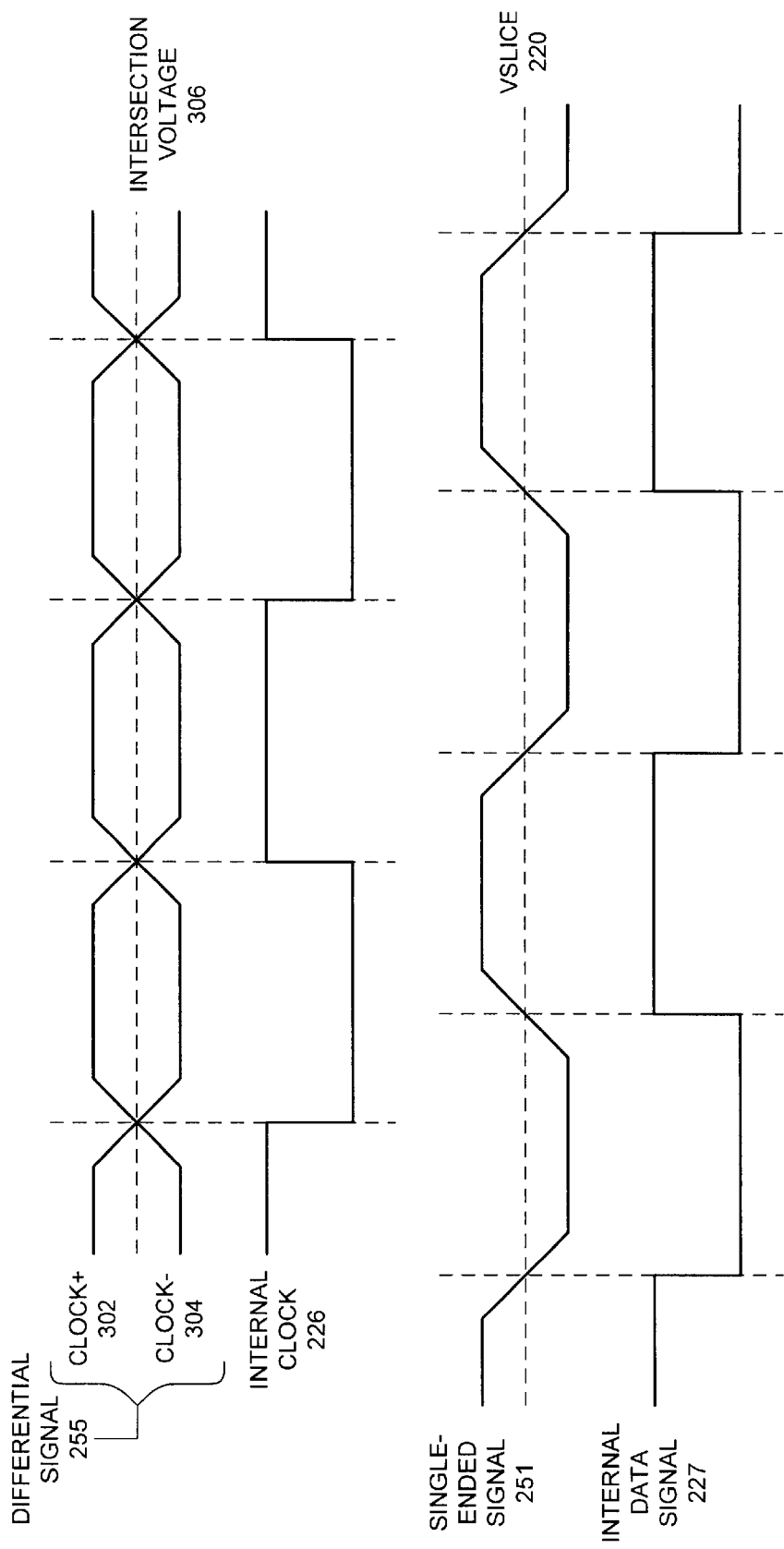

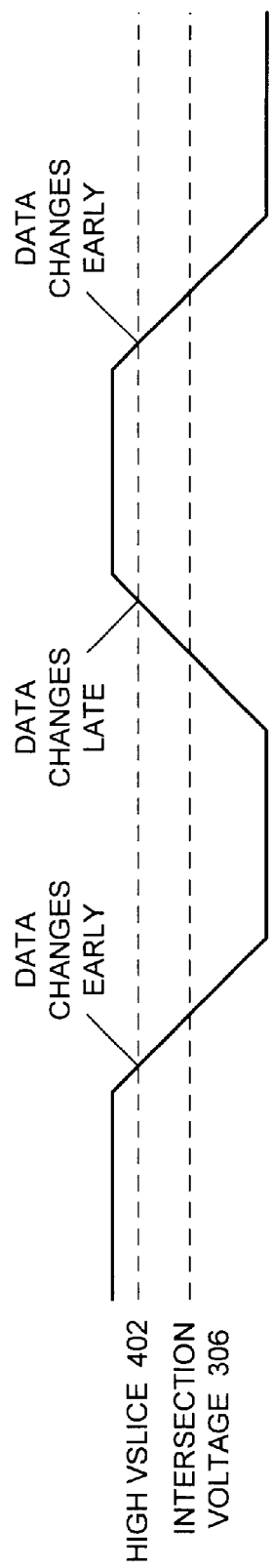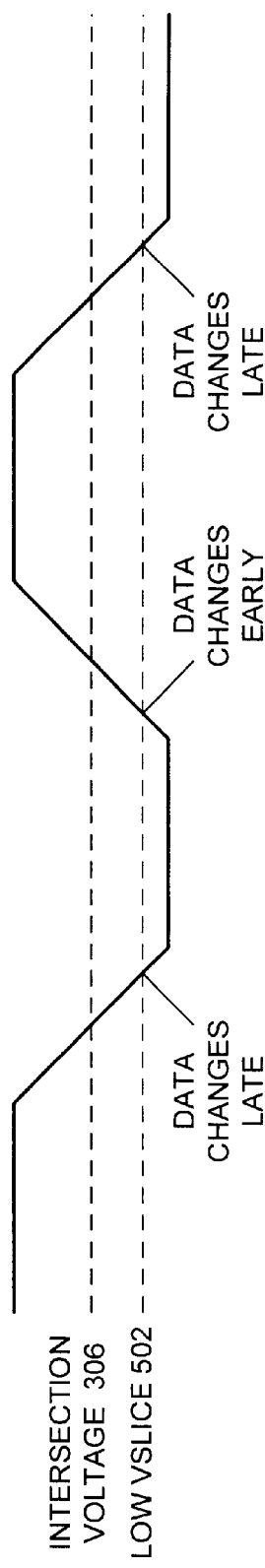

USING A DIFFERENTIAL SIGNAL IN ADJUSTING A SLICE VOLTAGE FOR A SINGLE-ENDED SIGNAL

BACKGROUND

1. Field of the Invention

The present invention relates to electrical circuits for transmitting electrical signals between a source and a destination. More specifically, the present invention relates to a method and an apparatus for transferring electrical signals between a transmitter and a receiver that uses a differential signal in adjusting a slice voltage for a single-ended signal.

2. Related Art

As computer systems continue to increase in speed at an exponential rate, timing margins for circuitry within the computer systems are becoming tighter. It is consequently becoming increasingly more important to ensure that data signals are precisely aligned with corresponding clock signals that are used to capture the data signals.

Data is commonly transferred between computer system components through either a differential signal or a single-ended signal. A differential signal includes a first signal line and a second signal line that are driven to different voltage values by a differential driver. This differential signal has a first value (such as a logical one) if the first signal line has a higher voltage than the second signal line, and a second value (such as a logical zero) if the second signal line has a higher voltage than the first signal line.

In contrast, a single-ended signal includes only a single signal line. This single signal line has a first value (such as a logical one) if the single signal line has a higher voltage than a reference "slice voltage." The single signal line has a second value (such as a logical zero) if the single signal line has a lower voltage than the slice voltage.

As timing margins become increasingly tighter, system designers are beginning to use differential signals instead of single-ended signals because differential signals tend to be more reliable in transferring data at higher clock frequencies.

Unfortunately, using differential signals doubles the number of signal lines that must be routed between components in a computer system. This significantly increases the number of wires and pins that are required to accommodate these signals.

These additional wires and pins can create a number of problems. (1) Routing large numbers of signal lines between computer system components across a printed circuit board tends to increase the separation between chips on the printed circuit board. This increases propagation delay, and can hence decrease clock speed. (2) Connectors with larger numbers of pins tend to be less reliable, and are more likely to fail. (3) Routing larger numbers of signal lines can require more chips to be used for bridging and routing signals between computer system components.

One way to alleviate some of the above-mentioned problems is to use differential signals for time-critical signals, and to use single-ended signals for less time-critical signals. For example, it is possible to use a differential signal to carry a system clock signal, while single-ended signals are used to carry data values.

One drawback to implementing such a hybrid system is that the slice voltage used in receiving single-ended signals does not change in the same way that a corresponding differential clock signal changes. Note that the differential clock signal and the slice voltage can change over time as a result of changes in environmental factors, such as temperature, humidity, vibration and power supply voltage.

What is needed is a method and an apparatus that adjusts a slice voltage so that the slice voltage tracks a differential signal as the slice voltage and the differential signal change over time.

SUMMARY

One embodiment of the present invention provides a system for receiving electrical signals that uses a differential signal in adjusting a slice voltage for a single-ended signal between the source and the destination. This differential signal includes a first signal line and a second signal line, wherein a first value is represented by the first signal line being at a higher voltage than the second signal line, and a second value is represented by the first signal line being at a lower voltage than the second signal line. The system operates by receiving the differential signal at the destination and comparing the differential signal against the slice voltage to obtain a comparison result. The system uses the comparison result to adjust the slice voltage, and also uses the slice voltage as a reference signal in capturing the single-ended signal. Note that this single-ended signal includes a single signal line, wherein the first value is represented by the single signal line having a voltage above the slice voltage, and the second value is represented by the single signal line having a voltage below the slice voltage.

In one embodiment of the present invention, comparing the differential signal against the slice voltage involves comparing an intersection voltage of the differential signal against the slice voltage. This intersection voltage is a voltage at which the first signal line and the second signal line cross during a transition between the first value and the second value on the differential signal.

In one embodiment of the present invention, using the comparison result to adjust the slice voltage includes using a feedback loop to adjust the slice voltage.

In one embodiment of the present invention, the system uses the slice voltage as a reference signal in capturing a plurality of single-ended signals at a plurality of receivers at the destination.

In one embodiment of the present invention, the system compares the differential signal against the slice voltage by feeding the first signal line and the second signal line of the differential signal into a first differential amplifier. The system uses a first RC integrator to integrate an output of the first differential amplifier to produce a first intermediate signal. The system also feeds the first signal line of the differential signal and the slice voltage through a second differential amplifier, and use a second RC integrator to integrate an output of the second differential amplifier to produce a second intermediate signal. Next, the system feeds the first intermediate signal and the second intermediate signal through a third differential amplifier to produce a third intermediate signal, and then feeds the third intermediate signal and a reference voltage through a fourth differential amplifier to produce the slice voltage.

In one embodiment of the present invention, the first RC integrator and the second RC integrator have long time constants when compared against a switching frequency of the differential signal.

In one embodiment of the present invention, the differential signal is a clock signal that periodically alternates between the first value and the second value.

In one embodiment of the present invention, the system uses the clock signal to clock circuitry that receives the single-ended signal.

In one embodiment of the present invention, comparing the differential signal against the slice voltage involves analyzing a pulse width of a signal produced by capturing the first signal line of the differential signal using the slice voltage as a reference voltage.

BRIEF DESCRIPTION OF THE FIGURES

FIG. 3 illustrates timing of a differential signal and a single-ended signal in accordance with an embodiment of the present invention.

FIG. 4 illustrates timing of a single-ended signal that is received with a high slice voltage in accordance with an embodiment of the present invention.

FIG. 5 illustrates timing of a single-ended signal that is received with a low slice voltage in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Computer System

Figure 1:
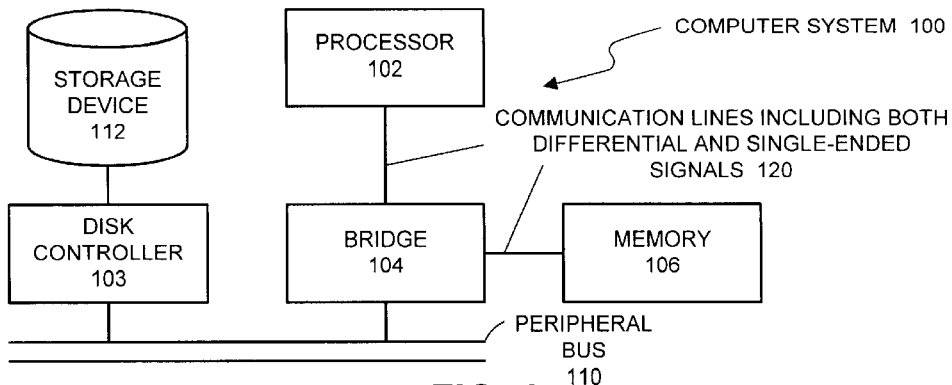
FIG. 1 illustrates a computer system in accordance with an embodiment of the present invention.

FIG. 1 illustrates a computer system 100 in accordance with an embodiment of the present invention. Computer system 100 includes processor 102, bridge 104, memory 106, peripheral bus 110, disk controller 103, and storage device 112. Processor 102 can include any type of processor, including, but not limited to, a microprocessor, a mainframe computer, a digital signal processor, a personal organizer, a device controller and a computational engine within an appliance. Processor 102 is coupled to memory 106 and peripheral bus 110 through bridge 104. Bridge 104 can include any type of switching circuitry that allows processor 102 to communicate with memory 106 and peripheral bus 110. Memory 106 can include any type of memory that can store code and data for execution by processor 102. Peripheral bus 10 can include any type of communication channel that can be used to couple bridge 104 with a peripheral device. Disk controller 103 includes circuitry for controlling storage device 112 and communicating with processor 102. Storage device 112 can include any type of non-volatile storage device that can be coupled to a computer system. This includes, but is not limited to, magnetic, optical, and magneto-optical storage devices, as well as storage devices based on flash memory and/or battery-backed up memory.

The present invention can generally be used to send electrical signals between or within any of the components of computer system 100 illustrated in FIG. 1. Note that although the present invention is described in the context of a computer system, it is not limited to computer systems, and can generally be applied in any system than sends electrical signals from a source to a destination.

Combining Differential and Single-Ended Signals

Figure 2:
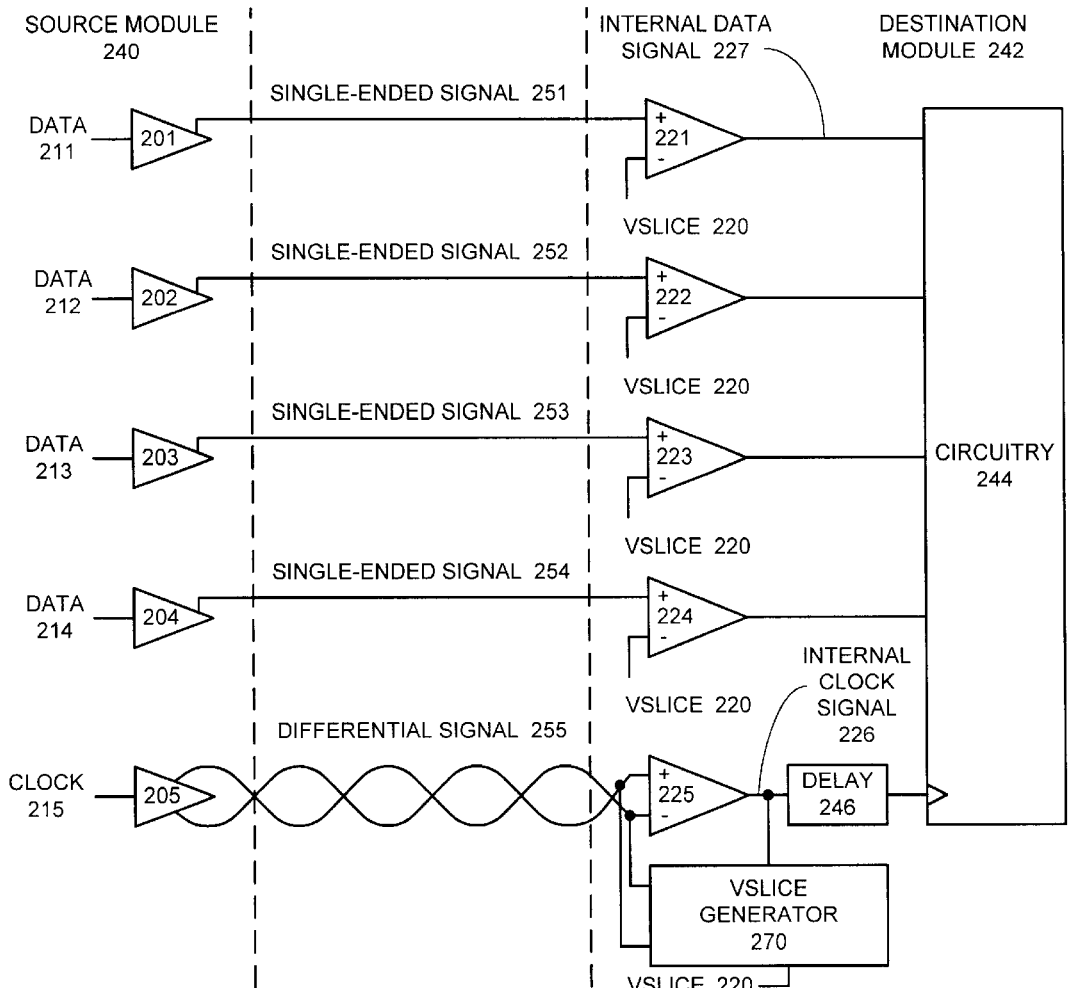
FIG. 2 illustrates a circuit that uses both differential and single-ended signals in accordance with an embodiment of the present invention.

FIG. 2 illustrates a circuit that uses both differential and single-ended signals in accordance with an embodiment of the present invention. The circuitry illustrated in FIG. 2 transfers data values 211–214 and clock signal 215 between a source module 240 and a destination module 242.

Within source module 240, data values 211–214 are routed through drivers (transmitters) 201–204 into signal-ended signals 251–254. Clock signal 215 is routed through differential driver 205 into differential signal 255. Note that differential signal 255 includes two signal lines.

Also note that drivers 201–204 for single-ended signals 251–254 can be identical to differential driver 205 for differential signal 255. The only difference is that a single output of drivers 201–204 is used for single-ended signals 251–254, whereas both outputs of driver 205 are used for differential signal 255.

Within destination module 242, single-ended signals 251–254 feed into inputs of receivers 221–224. (Note that the term receiver and amplifier are used interchangeably throughout this specification.) The other input of each of the receivers 221–224 is tied to a slice voltage, Vslice 220. Vslice 220 is a reference voltage that is used to determine if single-ended signals 251–254 have a first value or a second value. If single-ended signal 251 has a voltage higher than the slice voltage 220, it has a first value (such as a logic one). If single-ended signal 251 has a voltage lower than the slice voltage 220, it has a second value (such as a logic zero).

Differential signal 255 feeds into differential receiver 225, which produces a first value (such as a logic one) if a first signal line of differential signal 255 has a higher voltage than a second signal line of the differential signal 255. Otherwise, if the first signal line has a lower voltage than the second signal line, receiver 225 produces a second value (such as a logic zero). The output of receiver 225 is an internal clock signal 226, which feeds through a delay element 246 into a clock input of circuitry 244. Circuitry 244 also receives data values 211–214 from receivers 221–224, which are clocked into circuitry 244 using the output of delay element 246.

Note that the same type of differential receiver circuit can be used to implement both receivers 221–224 for single-ended signals 251–254, and receiver 225 for differential signal 255.

Vslice 220 is produced by circuitry within Vslice generator 270, which is described in more detail below with reference to FIG. 8. Vslice generator 270 compares differential signal 255 with Vslice 220 in order to adjust Vslice 220 to track changes in differential signal 255.

Timing of Differential and a Single-Ended Signals

FIG. 3 illustrates timing relationships for a differential signal 255 and a single-ended signal 251 in accordance with an embodiment of the present invention. Differential signal 255 includes clock+signal 302 and clock−signal 304. When clock+signal 302 has a higher voltage than clock−signal 304, internal clock signal 226 has a high value. When clock+signal 302 has a lower voltage than clock−signal 304, internal clock signal 226 has a low value. Clock+signal 302 and clock-signal 304 intersect at intersection voltage 306. Note that intersection voltage 306 can vary from link to link, depending upon manufacturing tolerances of the chip fabrication processes, as well as environmental factors, such as temperature and power supply voltage.

Single-ended signal 251 operates in a similar way. When single-ended signal 251 has a higher voltage than Vslice 220, internal data signal 227 has a high value, and when single-ended signal 251 has a lower voltage than Vslice 220, internal data signal 227 has a low value.

Note that the clock transitions are offset from the data transitions by delay element 246 so that clock edges of internal clock signal 226 line up approximately midway between transitions of internal data signal 227.

Also note that in order to achieve the most predictable timing, Vslice 220 for data receivers 221–224 should be the same as intersection voltage 306 for differential receiver 225.

Timing of a Single-Ended Signal with Different Slice Voltages

FIG. 4 illustrates timing of single-ended signal 251 that is received with a high slice voltage 402 in accordance with an embodiment of the present invention. As can be seen from FIG. 4, if high slice voltage 402 is higher than intersection voltage 306, then the high-going data transitions suffer decreased setup time with respect to corresponding clock signal 226. At the same time, the low-going data transitions suffer decreased hold time.

FIG. 5 illustrates timing of single-ended signal 251 that is received with a low slice voltage 502 in accordance with an embodiment of the present invention. As can be seen from FIG. 5, if low slice voltage 502 is lower than intersection voltage 306, then the low-going data transitions suffer decreased setup time with respect to the corresponding clock signal 226. At the same time, the high-going data transitions suffer decreased hold time.

Circuit for Comparing a Differential Signal with a Slice Voltage

Figure 6:
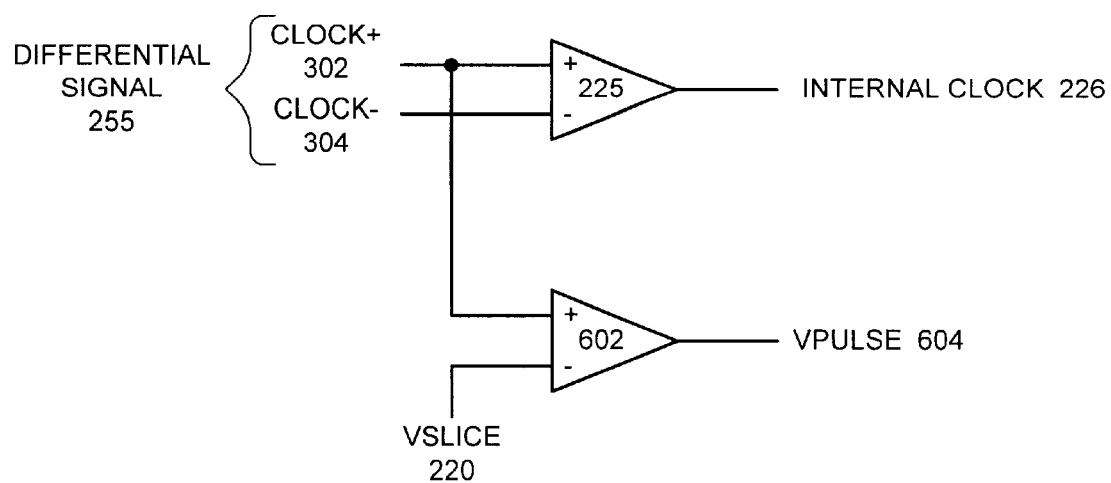
FIG. 6 illustrates a circuit that compares a differential signal with a slice voltage in accordance with an embodiment of the present invention.

FIG. 6 illustrates a circuit that compares differential signal 255 with a slice voltage 220 in accordance with an embodiment of the present invention. The circuitry illustrated in FIG. 6 includes differential receiver 225 from FIG. 2 as well as differential receiver 602. Differential receiver 602 receives clock+signal 302 as a first input and Vslice 220 as a second input. The output of differential receiver 602 is Vpulse signal 604.

Figure 7:
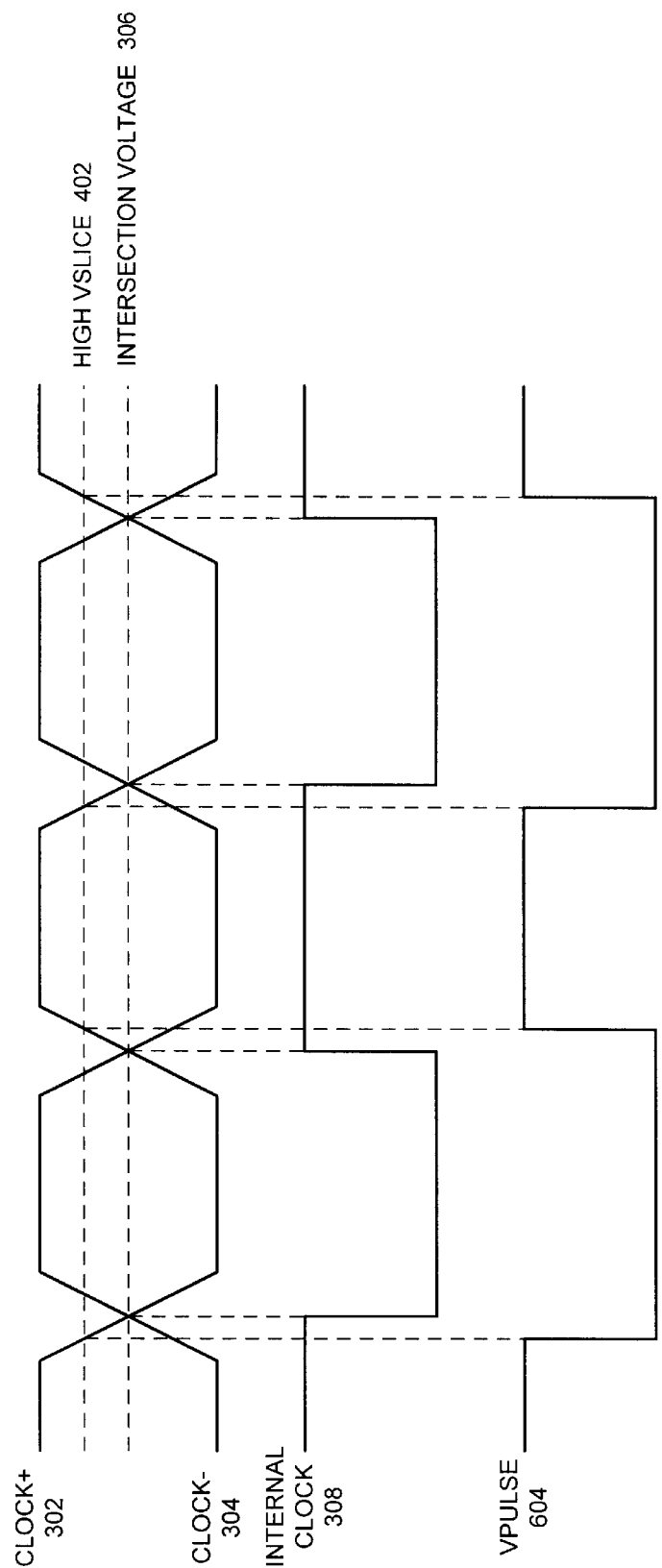
FIG. 7 illustrates timing for the circuit that appears in FIG. 6 in accordance with an embodiment of the present invention.

FIG. 7 illustrates timing for the circuit that appears in FIG. 6 in accordance with an embodiment of the present invention. As was illustrated in FIG. 3, the output of receiver 225 is internal clock signal 226, which changes state when clock+signal 302 and clock-signal 304 cross at intersection voltage 306.

In the case where the slice voltage 402 is higher than intersection voltage 306, Vpulse signal 604, which is the output of differential receiver 602, differs from internal clock signal 226. More specifically, internal clock signal 226 alternates between high and low voltage levels with an approximately 50% duty cycle, whereas Vpulse signal 604 has spends more time at a low voltage level and less time at a high voltage level.

Note that the pulse width of Vpulse signal 604 varies with the slice voltage 220. As slice voltage 220 gets higher, the pulse width decreases. Conversely, as slice voltage 220 gets lower, the pulse width increases. This fact is exploited by the circuitry illustrated in FIG. 8 to provide feedback that is used to dynamically adjust Vslice 220.

Circuit for Adjusting the Slice Voltage

Figure 8:
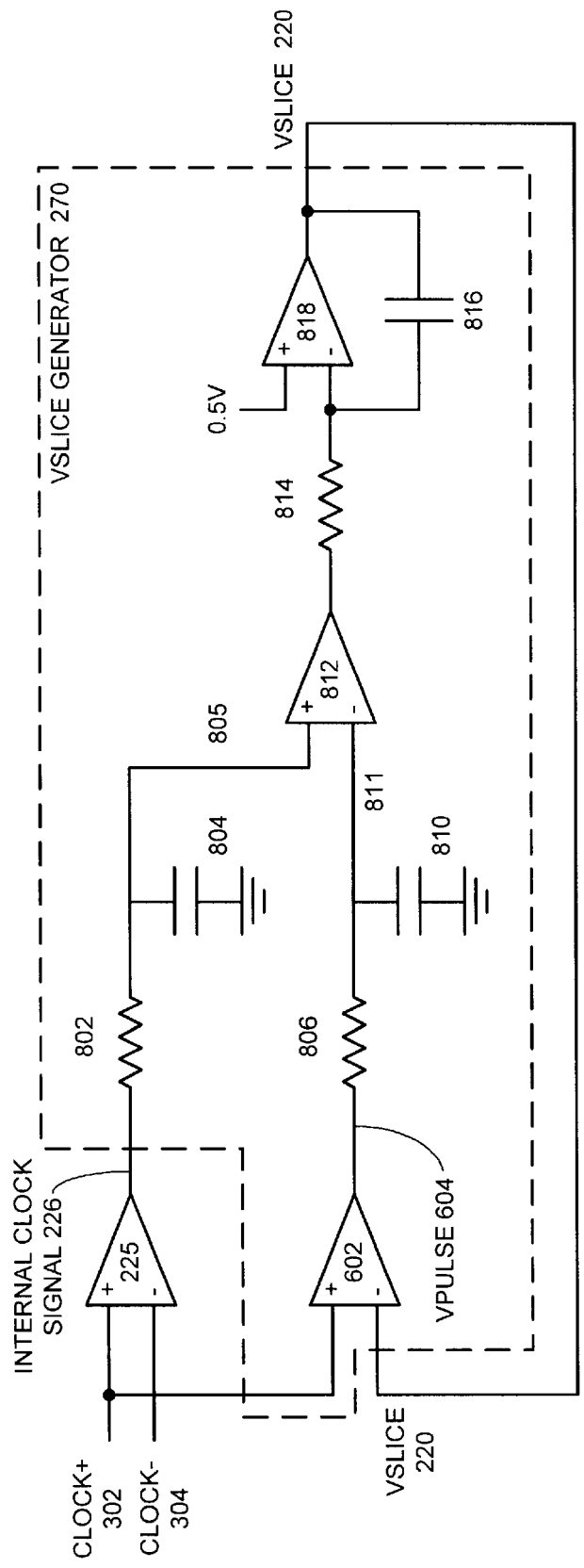
FIG. 8 illustrates a circuit that compares the differential signal with the slice voltage in order to adjust the slice voltage in accordance with an embodiment of the present invention.

FIG. 8 illustrates circuitry that compares differential signal 255 with slice voltage 220 in order to adjust slice voltage 220 in accordance with an embodiment of the present invention. The circuitry illustrated in FIG. 8 includes the same differential receivers 225 and 602 as are illustrated in FIG. 7.

The circuitry illustrated in FIG. 8 additionally includes a number of components that adjust Vslice 220. The output of differential receiver 225 feeds through an RC integrator comprised of resistor 802 and capacitor 804 to produce a first intermediate signal 805, which has a voltage that approximates the average voltage of internal clock signal 226. The output of differential receiver 602 feeds through an RC integrator comprised of resistor 806 and capacitor 810 to produce a second intermediate signal 811, which has a voltage that approximates the average voltage of Vpulse signal 604.

Differential receiver 812 receives intermediate signals 805 and 811 as inputs and produces an output. If intermediate signal 805 has a higher voltage than intermediate signal 811, the output of differential receiver 812 is a high voltage. Otherwise, the output of differential receiver 812 is a low voltage.

The output of differential receiver 812 feeds through resistor 814 into an input of differential receiver 818. The other input of differential receiver 818 is tied to an intermediate voltage between the low voltage and the high voltage. For example, if the low voltage is zero volts and the high voltage is one volt, the intermediate voltage can be one half of one volt.

The output of differential receiver 818 is Vslice 220, which is tied back to resistor 814 through capacitor 816. Capacitor 816 acts to keep the output of differential receiver 818 at a relatively constant value.

Note that time constants of the RC integrators are long when compared against the frequency of clock signal 215, but are short when compared against the likely frequency of changes to intersection voltage 306 due to environmental factors. Also note that the time constant associated with resistor 814 and capacitor 816 is much longer than the time constants for the RC integrators.

For example, if the period of clock signal 215 is two nanoseconds, resistors 802 and 806 can be one kilo-Ohm and capacitors 804 and 810 can be 40 pico-Farads. Resistor 814 can also be one kilo-Ohm, and capacitor 816 can be one nano-Farad. Note that these values are merely presented for purposes of illustration. In general, many different values of capacitance and resistance can be used.

The circuitry illustrated in FIG. 8 operates generally as follows. Suppose that Vslice 220 is higher than intersection voltage 306. In this case, as is illustrated in FIG. 7, Vpulse signal 604 has a smaller pulse width than internal clock signal 226. This causes intermediate signal 811, which is generated from Vpulse signal 604, to have a lower voltage than intermediate signal 805, which is generated from internal clock signal 226. Hence, differential receiver 812 will generate a high voltage, which will cause differential receiver 818 to generate a low voltage. This will draw charge from capacitor 816, and will consequently cause the voltage of Vslice 220 to be reduced.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for receiving electrical signals that uses information gained from analyzing a differential signal to adjust a slice voltage for a single-ended signal between a source and a destination, comprising:
   receiving the differential signal at the destination, wherein the differential signal includes a first signal line and a second signal line, wherein a first value is represented by the first signal line being at a higher voltage than the second signal line, and a second value is represented by the first signal line being at a lower voltage than the second signal line;
   comparing the differential signal against the slice voltage to obtain a comparison result;
   using the comparison result to adjust the slice voltage; and
   using the slice voltage as a reference signal in capturing the single-ended signal at a receiver for the single-ended signal at the destination;
   wherein the single-ended signal includes a single signal line, wherein the first value is represented by the single signal line having a voltage above the slice voltage, and the second value is represented by the single signal line having a voltage below the slice voltage.

2. The method of claim 1, wherein comparing the differential signal against the slice voltage involves comparing a first intersection voltage of the differential signal against a second intersection voltage at a point where the slice voltage intersects a selected leg of the differential signal; and
   wherein the first and second intersection voltages are voltages at which the first signal line and the second signal line cross during a transition between the first value and the second value on the differential signal.

3. The method of claim 1, wherein using the comparison result to adjust the slice voltage includes using a feedback loop to adjust the slice voltage.

4. The method of claim 1, further comprising using the slice voltage as the reference signal in capturing a plurality of single-ended signals at a plurality of receivers at the destination.

5. The method of claim 1, wherein comparing the differential signal against the slice voltage further comprises:
   feeding the first signal line and the second signal line of the differential signal into a first differential amplifier;
   using a first RC integrator to integrate an output of the first differential amplifier to produce a first intermediate signal;
   feeding the first signal line of the differential signal and the slice voltage through a second differential amplifier;
   using a second RC integrator to integrate an output of the second differential amplifier to produce a second intermediate signal;
   feeding the first intermediate signal and the second intermediate signal through a third differential amplifier to produce a third intermediate signal; and
   feeding the third intermediate signal and a reference voltage through a fourth differential amplifier to produce the slice voltage.

6. The method of claim 5, wherein the first RC integrator and the second RC integrator have long time constants when compared against a switching frequency of the differential signal.

7. The method of claim 1, wherein the differential signal is a clock signal that periodically alternates between the first value and the second value.

8. The method of claim 7, further comprising using the clock signal to clock circuitry that receives the single-ended signal.

9. The method of claim 7, wherein comparing the differential signal against the slice voltage involves analyzing a pulse width of a captured signal produced by capturing the first signal line of the differential signal using the slice voltage as a reference voltage.

10. An apparatus that receives electrical signals by using information gained from analyzing a differential signal to adjust a slice voltage for a single-ended signal sent from a source to a destination, comprising:
    an input that receives the differential signal at the destination, wherein the differential signal includes a first signal line and a second signal line, wherein a first value is represented by the first signal line being at a higher voltage than the second signal line, and a second value is represented by the first signal line being at a lower voltage than the second signal line;
    a comparison circuit that is configured to compare the differential signal against the slice voltage to obtain a comparison result;
    a slice voltage generation circuit that is configured to use the comparison result to adjust the slice voltage; and
    a capture circuit that is configured to use the slice voltage as a reference signal in capturing the single-ended signal;
    wherein the single-ended signal includes a single signal line, wherein the first value is represented by the single signal line having a voltage above the slice voltage, and the second value is represented by the single signal line having a voltage below the slice voltage.

11. The apparatus of claim 10, wherein the comparison circuit is configured to compare a first intersection voltage of the differential signal against a second intersection voltage at a point where the slice voltage intersects a selected leg of the differential signal;
    wherein the first and second intersection voltages are voltages at which the first signal line and the second signal line cross during a transition between the first value and the second value on the differential signal.

12. The apparatus of claim 10, wherein the slice voltage generation circuit is configured to adjust the slice voltage using a feedback loop.

13. The apparatus of claim 10, wherein the capture circuit is configured to use the slice voltage as the reference signal in capturing a plurality of single-ended signals at a plurality of receivers.

14. The apparatus of claim 10, wherein the comparison circuit comprises:
    a first differential amplifier that takes as input the first signal line and the second signal line of the differential signal;
    a first RC integrator that is configured to integrate an output of the first differential amplifier to produce a first intermediate signal;
    a second differential amplifier that takes as input the first signal line of the differential signal and the slice voltage;
    a second RC integrator that is configured to integrate an output of the second differential amplifier to produce a second intermediate signal;
    a third differential amplifier that takes as input the first intermediate signal and the second intermediate signal and produces a third intermediate signal; and a fourth differential amplifier that takes as input the third intermediate signal and a reference voltage and produces the slice voltage.

15. The apparatus of claim 14, wherein the first RC integrator and the second RC integrator have long time constants when compared against a switching frequency of the differential signal.

16. The apparatus of claim 10, wherein the differential signal is a clock signal that periodically alternates between the first value and the second value.

17. The apparatus of claim 16, further comprising receiving circuitry that uses the clock signal to clock circuitry to receive the single-ended signal.

18. The apparatus of claim 16, wherein comparing the differential signal against the slice voltage involves analyzing a pulse width of a captured signal produced by capturing the first signal line of the differential signal using the slice voltage as a reference voltage.

19. A computer system including a circuitry that communicates electrical signals by using information gained from analyzing a differential signal to adjust a slice voltage for a single-ended signal sent from a source to a destination, comprising:

a processor;

a memory;

an input that receives the differential signal at the destination, wherein the differential signal includes a first signal line and a second signal line, wherein a first value is represented by the first signal line being at a higher voltage than the second signal line, and a second value is represented by the first signal line being at a lower voltage than the second signal line;

a comparison circuit that is configured to compare the differential signal against the slice voltage to obtain a comparison result;

a slice voltage generation circuit that is configured to use the comparison result to adjust the slice voltage; and a capture circuit tat is configured to use the slice voltage as a reference signal in capturing the single-ended signal;

wherein the single-ended signal includes a single signal line, wherein the first value is represented by the single signal line having a voltage above the slice voltage, and the second value is represented by the single signal line having a voltage below the slice voltage.

20. The computer system of claim 19, wherein the comparison circuit is configured to compare a first intersection voltage of the differential signal against a second intersection voltage at a point where the slice voltage intersects a selected leg of the differential signal;

wherein the first and second intersection voltages are all voltages at which the first signal line and the second signal line cross during a transition between the first value and the second value on the differential signal.

* * * * *